(No Model.)
A. MUIRHEAD.
Insulated Telegraph Wire.
No. 230,803. Patented Aug. 3, 1880.
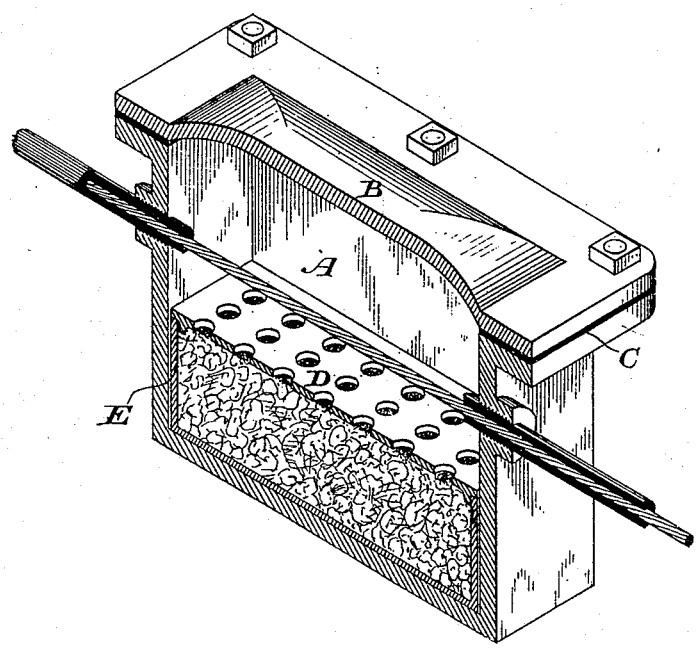
WITNESSES
Wm A. Skinkle.
Geo. W. Buck.
INVENTOR
Alexander Muirhead.
By his Attorneys
Baldwin, Hopkins & Peyton

UNITED STATES PATENT OFFICE.

ALEXANDER MUIRHEAD, OF OAKWOOD, FARQUHAR ROAD, UPPER NORWOOD, LONDON, ENGLAND.

INSULATED TELEGRAPH-WIRE.

SPECIFICATION forming part of Letters Patent No. 230,803, dated August 3, 1880.

Application filed March 24, 1880. (No model.)

*To all whom it may concern:*

Be it known that I, ALEXANDER MUIRHEAD, a subject of the Queen of Great Britain, doing business at 29 Regency street, Westminster, England, and resident at Oakwood, Farquhar Road, Upper Norwood, London, England, have invented certain new and useful Improvements in the Art of Protecting Underground and other Electric-Telegraph Wires, of which the following is a specification.

In my invention I make use of conducting-wires covered preferably with the insulator described as "ozocerite," in United States Letters Patent No. 207,860, September 10, 1878, to Field and Talling, for compounds for coating telegraph-wires, now known as "negrite." To protect the wires from mechanical injury, I serve them outside with fibrous material impervious to sea-water and the attack of animalculæ.

I have discovered as most suitable for this purpose "gumootie" fiber, which is obtained from the species of palm called the "gomuti" palm, found in what are known in England as the "Straits settlements," being the countries contiguous to the Straits of Malacca, off the south of India. This fiber forms a sort of nest in which the nut of the palm rests, and is collected after the fruit is gathered, and made into rope, &c. It is impervious to the effects of sea-water and to the attacks of animalculæ, from which all other kinds of fibrous material in that locality suffer. It is found from long experience to be more durable than hemp, jute, or any other such material hitherto used.

For further protection from mechanical injury I partially vulcanize or case-harden the insulating material, negrite. This I do after coating the wires by exposing the outside of the coating for a short time to the action of sulphur, either in solution in chloride of sulphur, or in a sulphur-vapor bath in well known methods of vulcanizing.

For the purpose of underground telegraphy, wires protected as above are laid in metallic or other pipes in the usual way.

To prevent variations in the electrical condition of these wires I further protect them by filling up the pipes with soluble silicates, such as water-glass. At frequent intermediate points in the circuit of such an underground system I insert test-boxes constructed of cast-iron and made air-tight by means of covers screwed down on vulcanized-rubber cushions.

To protect the wires from moisture, I place in the lower portion of these test-boxes a chamber containing chloride of calcium, quicklime, or other absorbent of moisture, and provided with a perforated cover, diaphragm, or partition, which separates it from that part of the test-box through which the wires pass.

In the drawing, A is the test-box, B the air-tight cover resting on the cushions C. D is the perforated diaphragm, E the chamber containing the desiccant.

It is obvious that a serving with fibrous material impervious to sea-water and to the attack of animalculæ may be advantageously used with any description of insulating material, though I prefer for the purpose the insulator and serving of fiber hereinbefore described.

What I claim as new, and desire to secure by Letters Patent, is—

1. The hereinbefore-described method of protecting electric-telegraph wires which consists in serving them with a wrapping of gumootie fiber, substantially as herein set forth.

2. The hereinbefore-described method of protecting electric-telegraph wires insulated or covered with negrite, which consists in partially vulcanizing or case-hardening the outside of the covering of negrite, and then serving it with a wrapping of gumootie fiber, substantially as herein set forth.

3. The hereinbefore-described method of protecting underground electric-telegraph wires, which consists in laying them in pipes or troughs filled up with soluble silicates, substantially as herein set forth.

4. An electric wire served with a wrapping of gumootie fiber, substantially as set forth.

5. An electric wire insulated or covered with negrite, partially vulcanized or case- ...ned on the outside, and provided with a ...ing of gumootie fiber, substantially as set ...rth.

6. The hereinbefore-described method of protecting underground electric-telegraph wires, which consists in surrounding them with soluble silicates and providing for testing them at intervals, substantially as set forth.

In witness whereof I have hereunto subscribed my name this 27th day of February, 1880.

ALEX. MUIRHEAD.

Witnesses:
CHAS. EDGAR MILLS,
WILLIAM D. WARD.